(No Model.) 2 Sheets—Sheet 1.
J. L. BOGERT.
CHANGEABLE SPEED GEARING.
No. 568,064. Patented Sept. 22, 1896.
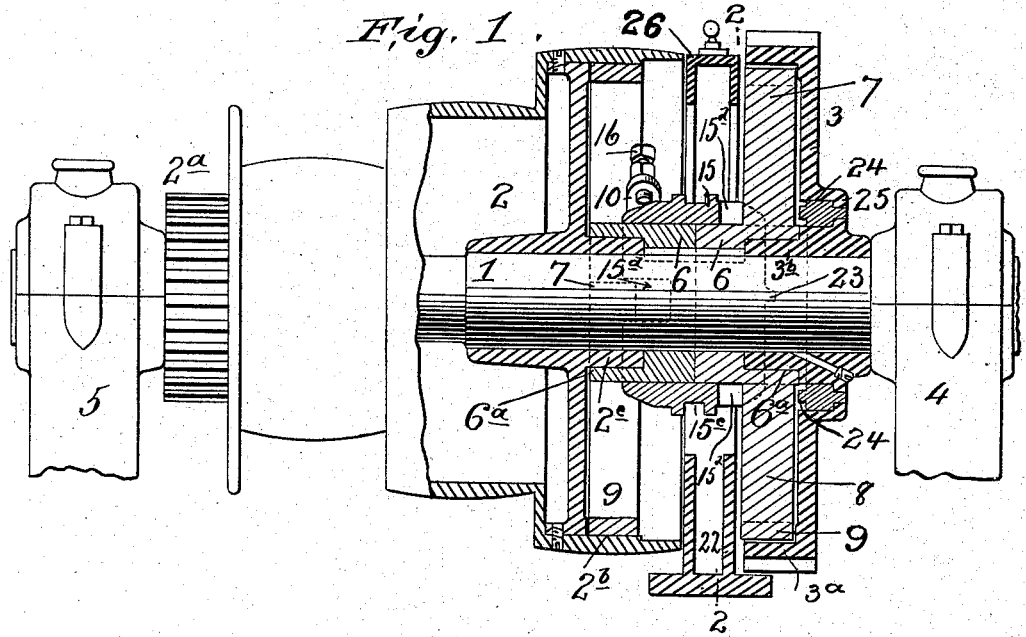
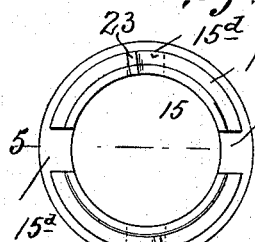
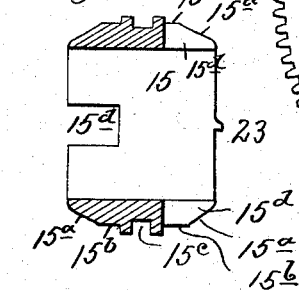
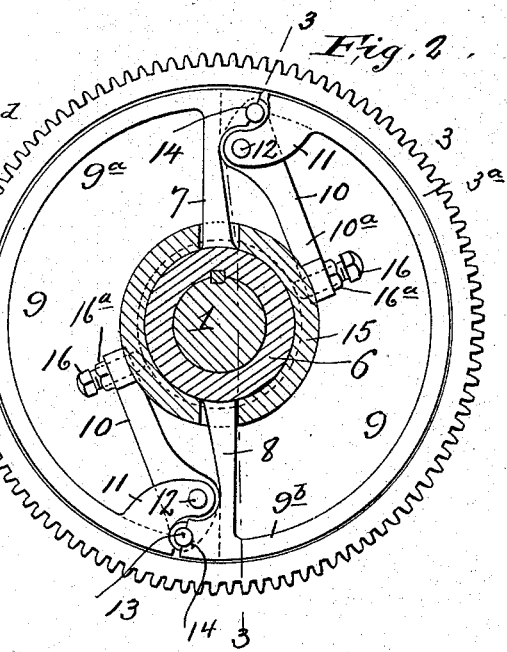
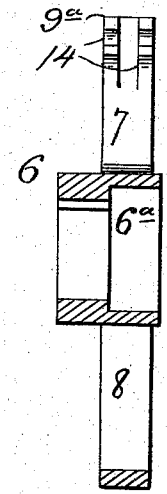
WITNESSES:
C. W. Benjamin
A. Habersang
INVENTOR
John L. Bogert
BY
T. F. Bourne
his ATTORNEY
THE NORRIS PETERS CO., PHOTO-LITHO., WASHINGTON, D. C.

(No Model.) 2 Sheets—Sheet 2.
J. L. BOGERT.
CHANGEABLE SPEED GEARING.
No. 568,064. Patented Sept. 22, 1896.
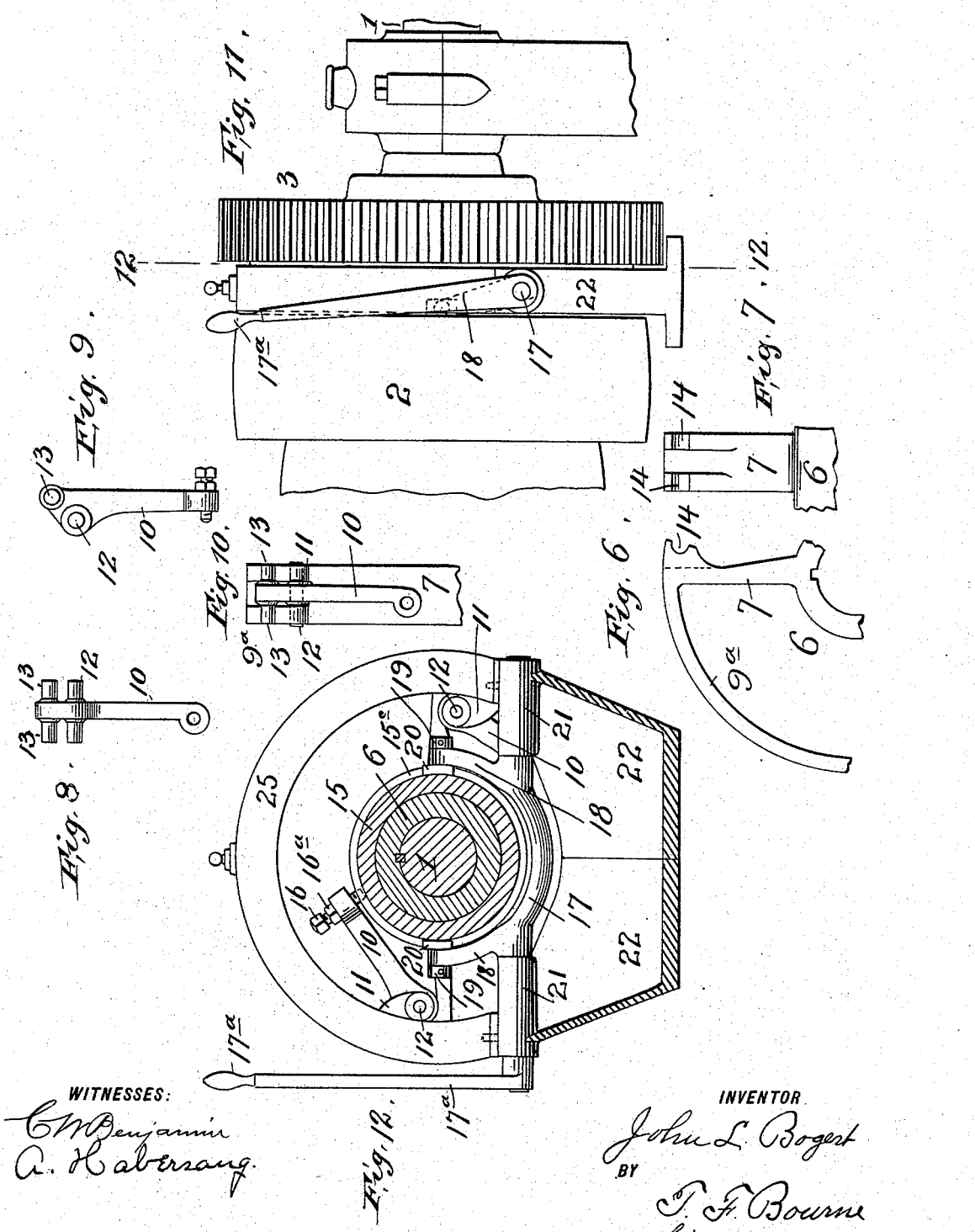
WITNESSES:
INVENTOR
John L. Bogert
BY
T. F. Bourne
his ATTORNEY

UNITED STATES PATENT OFFICE.

JOHN L. BOGERT, OF FLUSHING, NEW YORK.

CHANGEABLE-SPEED GEARING.

SPECIFICATION forming part of Letters Patent No. 568,064, dated September 22, 1896.

Application filed January 18, 1896. Serial No. 575,962. (No model.)

*To all whom it may concern:*

Be it known that I, JOHN L. BOGERT, residing in Flushing, Queens county, New York, have invented certain new and useful Improvements in Changeable-Speed Gearing, of which the following is a specification.

My invention relates to improvements in changeable-speed gearing, and has reference more particularly to means for causing one rotative body to communicate rotary motion to another by both frictional and positive contact, and to novel devices for producing frictional engagement between two bodies.

The invention consists in the combination, with two rotative bodies, of devices for causing frictional engagement between them, and coactive parts carried by said bodies in such positions that if the frictional devices should slip sufficiently the said parts will come in contact to cause one body to rotate the other by positive connection.

The invention further consists in the novel details of improvement and the combinations of parts that will be more fully hereinafter set forth and then pointed out in the claims.

Reference is to be had to the accompanying drawings, forming part hereof, wherein—

Figure 1 is a partly sectional side view of the pulley and head-gear of a lathe provided with my improvement. Fig. 2 is a cross-sectional view at right angles to the plane of Fig. 1 on the line 2 2, showing my improved friction devices as applied to the head-gear of a lathe. Fig. 3 is a partly sectional edge view of the friction-ring on the line 3 3 in Fig. 2. Fig. 4 is a face view, reduced, of the spool or bobbin for operating the levers or fingers of the friction device or clutch. Fig. 5 is a section on the line 5 5 in Fig. 4. Fig. 6 is a detail side view of a portion of one of the friction-rings. Fig. 7 is an edge view thereof. Fig. 8 is an edge view of one of the ring-operating levers or fingers. Fig. 9 is a side view thereof. Fig. 10 is an edge view of one of said levers or fingers in position on one of the ring portions. Fig. 11 is a side elevation of a portion of the driving mechanism of a lathe having my improvements applied, showing a lever for operating the friction or clutching devices; and Fig. 12 is a section on the line 12 12 in Fig. 11.

Referring now to the accompanying drawings, in which similar numerals of reference indicate corresponding parts in the several views, the number 1 indicates a spindle or shaft or other suitable rotative body. 2 is a cone-pulley or other rotative body mounted to rotate loosely thereon and adapted to drive said spindle. 3 is a head-gear or other rotative body also mounted loosely on said spindle, shaft, or body 1 to rotate the latter, and 4 5 are suitable bearings or supports for said spindle or body 1. The above parts may be of suitable or well-known construction, and are illustrated to show the application of my improvements to the driving mechanism of a lathe or other analogous structure.

Upon the spindle or shaft 1 are secured the friction devices which are adapted to clutch the parts 2 3 to said spindle to drive the latter. 6 is a hub or sleeve splined or otherwise secured on the spindle or shaft 1, and from this hub or sleeve project oppositely-extending arms 7 8. The arms 7 8 carry a split or divided ring 9. (See Fig. 2.) This ring or split ring is composed of two halves $9^a$ $9^b$, the part $9^a$ being carried by the arm 7 and the part $9^b$ by the arm 8. The ends of the parts $9^a$ $9^b$ of the ring lie near each other and are adapted to be pressed apart to effect a frictional or clutching action with the enveloping surface of part 2 or 3. For this purpose I provide a lever or finger 10, which connects with the adjacent ends of the parts $9^a$ $9^b$, so that when properly moved it will expand the ring. For this purpose one end of one part of the ring 9 is provided with a jaw or fork 11, in or between which the lever 10 lies, being pivoted thereto by a pivot 12 passing through said jaw or fork and through said lever. The lever 10 also carries a stud or gudgeons 13 projecting from opposite sides thereof and lying in recesses or bearings 14 in the end of the adjacent part of the ring 9.

It will be seen that the long arm $10^a$ of the lever 10 extends inwardly or toward the spindle or shaft 1, and when the end $10^a$ of the lever is moved outwardly its stud or gudgeons will press against the adjacent part of the friction-ring and thus expand the latter.

In the examples illustrated I have shown two levers 10, operating on the adjacent ends of the parts $9^a$ $9^b$ of the friction-ring 9, but it is evident that the ring 9 could be split or divided at but one part and one lever 10 be provided. The advantage of having the friction-ring in two parts is that I obtain a more even circumferential expansion of the ring and greater frictional holding power. It will also be evident that the connection between the parts of the friction-ring and the lever 10 can be otherwise than as shown, but I find this a convenient arrangement, as the pivot 12 can be readily driven through the lever 10 and the jaws 11, and also permits ready detachment of the parts.

The expansible ring 9 lies within an annular rim or ring $3^a$, within which it fits freely in its normal condition, and is adapted when expanded to grip the same by frictional engagement. In the example illustrated this rim is carried by or is part of the head-gear 3, which is counterbored, as shown in Fig. 1, to receive the ring 9. As shown, the gear 3 has a hub $3^b$, which enters an annular recess or counterbore $6^a$ in the hub 6, (see Figs. 1 and 3,) whereby a proper bearing for the gear 3 is provided. Suitable means may be provided for operating the lever or levers 10 to expand the ring 9. I have shown a spool or bobbin 15 mounted loosely on the hub 6, so as to slide thereon, and having a curved, beveled, or inclined edge or side $15^a$ adapted to operate the lever or levers 10. For the purpose of making proper adjustment and to take up wear between the end $10^a$ of lever 10 and bobbin or spool 15, I place a set-screw 16 at the end of said lever and provide a jam-nut $16^a$ to hold said screw. The end of screw 16 is adapted to bear upon the edge $15^a$ of bobbin or spool 15 as well as upon the annular surface $15^b$ thereof. When the sleeve or spool 15 is moved toward the lever or levers 10, it will move the latter outwardly and thus expand the ring 9 to cause frictional engagement between it and the rim $3^a$, so that the part 3 can rotate the part 1, or vice versa, according to which is the driving member. In the example illustrated the part 3 is the driving member.

Any suitable means may be employed for sliding the bobbin or spool 15 to cause the parts 9 $3^a$ to clutch or unclutch. In Figs. 11 and 12 I have shown a convenient arrangement for this purpose as applied to a lathe. 17 is a rock-shaft having arms 18, the center of this shaft and said arms being curved to embrace the spool 15, so as to form a compact structure. The arms 18 carry pins or studs 19 to enter a circumferential groove $15^c$ in the bobbin or spool 15. The pins or studs 19 may carry loosely-fitting blocks 20, which lie in the groove $15^c$ of spool 15. The shaft 17 carries a handle or lever $17^a$, by which the shaft can be rocked, and said shaft is journaled in suitable bearings 21, properly supported. The bearings 21 are shown carried by channeled castings 22, which are separable, as indicated in Fig. 12, so that said bearings can be slipped on and off said shaft, the handle $17^a$ for this purpose being removable from the shaft 17. This arrangement provides a simple and convenient arrangement for supporting and adjusting the shaft 17 and its arms 18 in position.

The frictional or clutch devices above described will afford a very strong and effective structure, but it may happen, and often does, with ordinary friction-clutches that slipping between the friction-surfaces will occur, especially where great power is being transmitted. To check the slipping just mentioned and to cause the driving member to rotate the driven member by a positive connection, I combine with a friction-clutch or frictional devices or with the friction devices or clutch above described a positive stop or connection. For this purpose I provide one edge at least of the bobbin or spool 15 with one or more teeth or projections 23, which are adapted to engage one or more stops or projections 24, carried by the gear or member 3. (See Figs. 1, 4, and 5.) The stops 24 are shown located in an annular groove 25 in the wall $3^b$ of the gear or member 3, said stops being suitably secured thereto, in which groove the tooth or teeth 23 are adapted to enter and travel. The stops 24 are in the path of the teeth 23 when the bobbin or spool 15 is moved longitudinally to cause the friction devices to act.

In order to allow the bobbin or spool 15 to have proper sliding movement relatively to the lever or levers 10 and to cause the spool 15 to be carried around with the ring 9, the edge of said spool is slotted at $15^d$ to receive the arms 7 and 8, whereby the latter will rotate said bobbin or spool. (See Fig. 1.) The depth of the slots $15^d$ is such as to allow the tooth or teeth 23 to project in line with the stop or stops 24.

With the above-described arrangements, if the friction devices or clutch should slip owing to the resistance offered to the rotating parts, the tooth 23 will come in contact with a stop 24 and thus cause the parts to rotate by a positive connection. It will be understood that if the parts do slip the stops 23 24 will come together under ordinary conditions easily, so as to reduce the danger of their breaking, as compared to two rotating parts coming together without the frictional resistance offered by the friction-clutch.

In the example illustrated the head-gear 3 will drive the spindle 1 through the friction devices or through the positive connection 23 24, or both, and by means of back gears operated by the pinion $2^a$, connected with the pulley 2, (not shown, but of ordinary construction used in lathes,) or if the spindle 1 were positively rotated it would rotate the gear 3 through the friction devices or the positive connection 23 24, if desired.

I have shown my improved friction-clutch devices also applied to the pulley 2 to cause the latter to rotate with spindle or shaft directly, or vice versa. For this purpose the pulley 2 is provided with an internal annular surface $2^b$ to receive a ring 9. For this purpose a duplicate of the hub 6, arms 7 8, ring 9, (or 9ª 9ᵇ,) and lever or levers 10 with the connected parts, as shown in Fig. 2, are provided and located substantially within the open end of the pulley. (See Fig. 1.) Both hubs 6 6 are shown placed close together and splined to the spindle or shaft 1, and the bobbin or spool 15 slides on both hubs 6. The ends of the bobbin or spool 1 are substantially alike, that is to say, provided with inclines 15ª and annular surfaces 15ᵇ and slots 15ᵈ for the arms 7 8. The arms 7 8 of the two sets of clutching devices are shown placed at right angles to each other for convenience. The pulley 2 also has a hub 2ᶜ, which enters a corresponding socket or counterbore 6ª in hub 6.

With the arrangements above described and as shown in Fig. 1, if the spool or bobbin 15 is moved to the right the friction devices will connect the gear 3 with the spindle or shaft 1, so that said gear will rotate said spindle (through the medium of the pulley 2, pinion 2ª, and back gears before mentioned) to develop power; but if the bobbin or spool 15 is moved to the left in Fig. 1 the friction or clutch devices at the left will connect the pulley 2 directly with the spindle or shaft 1 to develop speed, while the gear 3 will rotate idly. Thus it will be seen that by moving the bobbin or spool 15 to the right or left power or speed can be obtained, or, in other words, power can be changed to speed or speed to power. If the bobbin or spool 15 is placed midway of its travel, parts 2 and 3 will be free.

26 is a suitable curved cover or casting placed between the pulley 2 and gear 3 to conceal and protect the operative parts of the mechanism.

Having now described my invention, what I claim is—

1. The combination of two rotative bodies, friction devices rigidly connected with one of said bodies and having an arm, a bobbin or spool adapted to operate said friction devices to frictionally connect said bodies and to be rotated by said arm, a projection carried by said bobbin or spool, and a projection carried by the other one of said bodies and adapted to be engaged by the first-mentioned projection to positively connect the two rotative bodies through the bobbin, substantially as described.

2. The combination of two rotative bodies, friction devices rigidly connected with one of said bodies and having an arm, a bobbin or spool having a slot or recess to receive said arm whereby said arm can rotate or drive said bobbin or spool, said bobbin being adapted to operate said friction devices to frictionally connect said bodies, a projection carried by said bobbin or spool, and a projection carried by the other one of said bodies and adapted to be engaged by the first-mentioned projection to positively connect the two rotative bodies through the bobbin, the slot or recess in the bobbin serving to allow the bobbin to move so that said projections can engage, substantially as described.

3. The combination of two rotative bodies, one of which has an annular web or flange and a projection, with a friction-clutch comprising a hub secured to the other body and having an arm carrying a rim or ring, means for expanding said rim or ring to cause frictional engagement with said web or flange, and a bobbin or spool having a projection to engage the first-mentioned projection, substantially as described.

4. The combination of two rotative bodies, one of which has an annular web or flange and a projection, with a clutch to engage said web or flange and comprising a hub secured to the other of said bodies, two arms projecting from said hub each arm carrying a rim or ring, levers or fingers to expand said rims or rings, a bobbin or spool to operate said levers, and a projection carried by said bobbin or spool to engage the first-mentioned projection, whereby when the bobbin or spool is moved to expand said rims or rings said projections will be moved into alinement, as and for the purposes specified.

5. In a friction-clutch, a hub, an arm extending therefrom and a rim or partial ring projecting from said arm, another arm projecting from said hub in the opposite direction to the first-mentioned arm, a rim or partial ring projecting from the second-mentioned arm, levers pivotally carried by diametrically-opposed ends of said rims or rings and adapted to act on the adjacent ends of said rims or rings, and means for operating said levers to separate said rims or partial rings, substantially as described.

6. In a friction-clutch, a hub having two arms projecting therefrom in opposite directions, a rim or partial ring extending from each arm, the corresponding ends of which rims or rings lie near each other, a jaw or bearing projecting from each rim near one end, a lever pivoted to each jaw, and a pin or gudgeon carried by each lever, the adjacent end of the next rim having a recess to receive said pin or gudgeon and means for operating said levers to expand said ring, substantially as described.

7. In a friction-clutch, the combination of a split rim or ring having a slotted bearing or jaw 11, a lever 10 pivoted in said slotted bearing or jaw 11 and a slotted bearing 14 for said lever to enter and act upon, the bearing 14 serving to resist lateral strain on the lever, substantially as described.

8. In a friction-clutch the combination of a hub having arms projecting in opposite directions, a rim or partial ring carried by each arm, a slotted jaw or bearing at one end of each rim or ring, a lever pivoted in each slotted jaw or bearing, a projection or gudgeon carried by each lever, the adjacent end of each rim or ring having a slotted bearing provided with a recess to receive the corresponding projection or gudgeon, said bearing serving to resist lateral strain on the lever, and a bobbin or spool adapted to slide on said hub to operate said levers, as and for the purposes specified.

9. In a friction-clutch, the combination of a hub, and an arm or arms connected therewith and a ring or rim carried thereby, with a bobbin or spool adapted to expand said rim or ring, said bobbin or spool having a slot or slots to receive said arm or arms, as and for the purposes specified.

10. In a friction-clutch the combination of two hubs placed side by side, arms carried by said hubs, rims or rings carried by said arms, levers carried by said rims or rings and arranged to expand the same, and a bobbin or spool mounted to slide on said hubs to operate said levers, said bobbin or spool having slots in its ends to receive said arms, as and for the purposes specified.

JOHN L. BOGERT.

Witnesses:
T. F. BOURNE,
A. HABERSANG.